July 13, 1943.  C. E. SWENSON  2,324,042
CONVEYER APPARATUS
Filed March 26, 1941  2 Sheets-Sheet 1
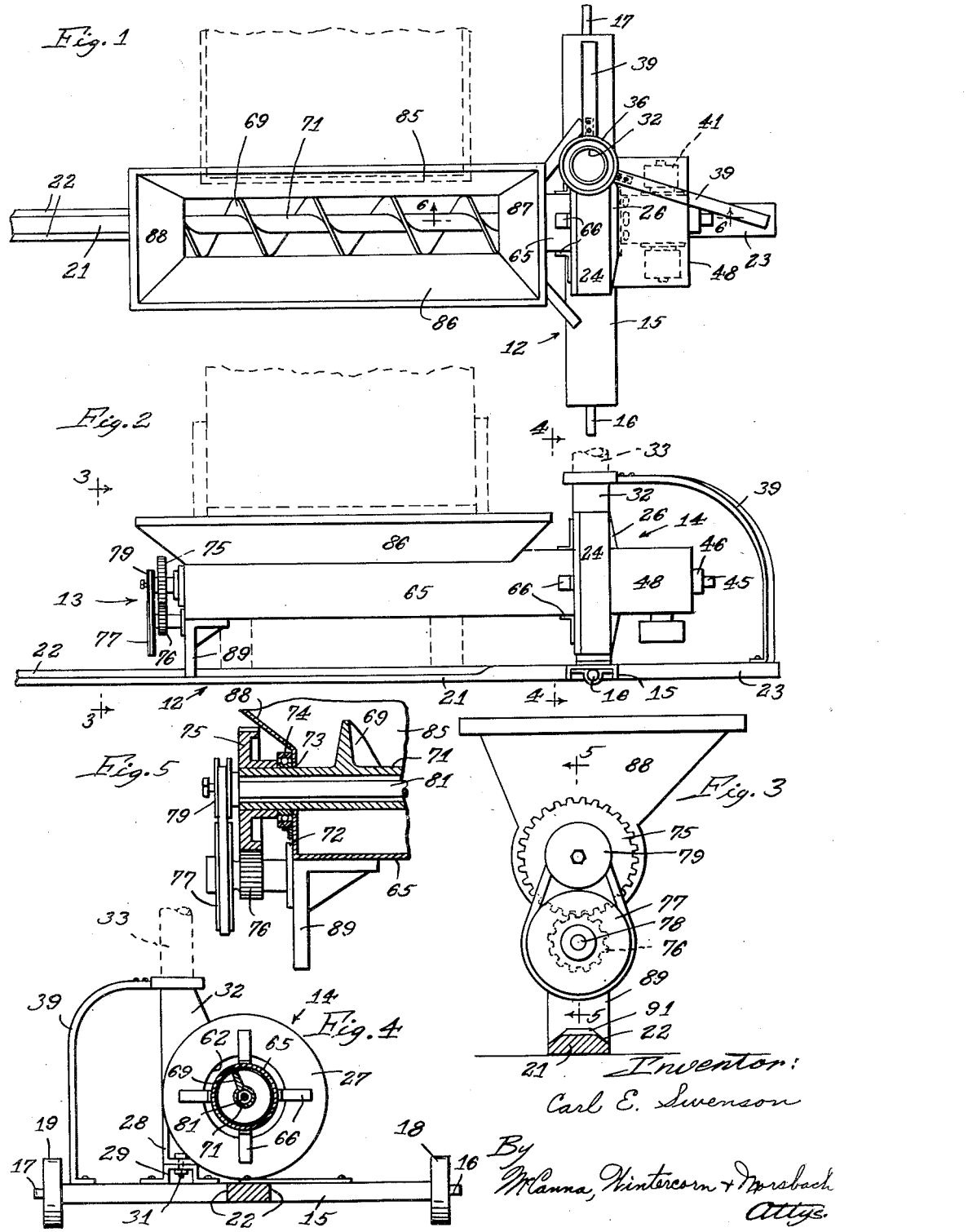

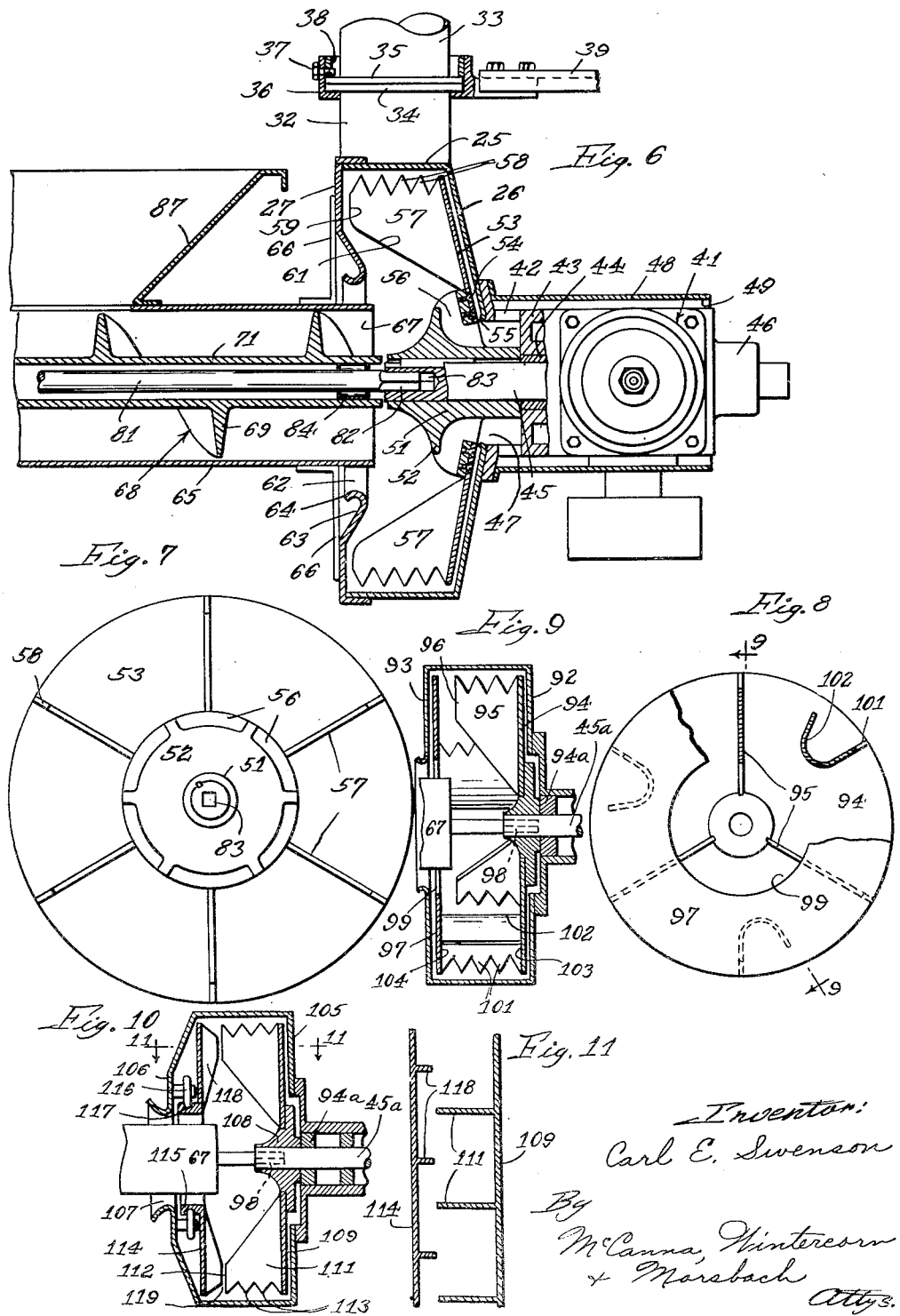

Patented July 13, 1943

2,324,042

UNITED STATES PATENT OFFICE 2,324,042

CONVEYER APPARATUS

Carl E. Swenson, Rockford, Ill.

Application March 26, 1941, Serial No. 385,232

6 Claims. (Cl. 302—37)

This invention relates to conveying apparatus and has special reference to devices more particularly adapted for conveying fibrous or granular material, such as silage, hay and similar farm produce.

While the device of the invention is suitable for the conveying of a wide variety of materials in addition to farm produce, I have for convenience shown and described the same as applied to such use and as embodied in what is commonly called a silo filler, and as used in agriculture for conveying all tyes of roughage such as silage, hay, straw and the like.

An important objection to prior art machines of this character has been the inefficiency thereof both with respect to the mechanical power and the labor consumed in their use. This invention is directed primarily to the production of a more efficient unit. For example, the common practice in the past has been to drive the vehicle loaded with the silage or other roughage alongside the hopper of the conveyer and to feed the material across the side of the vehicle into the hopper, which operation is relatively slow and laborious. Another source of difficulty is the fact that the material is fed into the blower in an intermittent fashion so that the material comes to the blower in a succession of batches which frequently overload the blower and thus greatly reduce its speed, the blower running substantially idle in the interval between batches, during which intervals it may regain all or a part of its speed. Thus the speed of the blower varies through a wide range and may in fact stop, due to overload. Obviously this mode of operation is inefficient and subjects the machine to severe strains.

A still further difficulty with machines of this character is in the form of the blower. Heretofore the efficiency of such blowers has been greatly handicapped by material wedging into the corners and the space between the impellers and the casing and thus producing an excessive drag even to the extent of occasionally stalling the blower, the material also being damaged as an incident to this occurrence. In other cases, even though operating with some degree of satisfaction, the aerodynamic quality of the blower is impaired due to material hanging to or entangling with the blades or vanes of the impeller and thus producing additional air resistance.

It has been common practice in such blowers to build the blades of the impeller so as to provide very little clearance between the housing of the blower and the ends of the blades for the reason that a limited amount of clearance was deemed necessary to eliminate wedging of material between the ends of the blades and the inside of the blower housing. I have found that even if this feature of construction were successful in preventing wedging of the material, which it is not, such construction does not produce good blower results because the compressed air is confined until the cell-shaped compartments between the vanes arrive at the proximity of the blower discharge so that a uniform flow of air is not produced.

An important object of the invention is therefore the provision of a conveyer of the class described of generally improved efficiency.

Another object of the invention is the provision of a conveyer of the class described having improved means for transporting the conveyer from place to place and for permitting of relative movement between parts of the conveyer so as to permit a vehicle to be driven past the conveyer in close proximity thereto, and the hopper of the conveyer to be moved into improved position for unloading.

Another object of the invention is the provision of improved means for supporting the conveyer structure for movement into and out of an operative position.

A still further object of the invention is the provision of a conveyer having improved means for feeding the material into the blower.

I have also aimed to provide an improved and more efficient blower of the type described having a novel form of impeller and novel means for controlling the flow of the solid material and air through the blower.

A still further object of the invention is the provision of a conveyer of the type described having novel driving means and improved means for controlling the feed of material to the blower.

Other objects and advantages will appear from the following description and the accompanying drawings, in which—

Figure 1 is a top view of a conveyer embodying my invention;

Fig. 2 is a side view thereof;

Fig. 3 is an end view taken on the line 3—3 of Fig. 2;

Fig. 4 is a view partly in section taken on the line 4—4 of Fig. 2;

Fig. 5 is a section through a part of the conveyer drive mechanism taken on the line 5—5 of Fig. 3;

Fig. 6 is a vertical section through the blower and adjoining end of the hopper taken on the line 6—6 of Figure 1;

Fig. 7 is a face view of the impeller shown in Fig. 6;

Fig. 8 is a face view partly in section of a modified form of impeller;

Fig. 9 is a section on the line 9—9 of Fig. 8;

Fig. 10 is a section through the impeller and housing of a modified form of blower, and Fig. 11 is a developed section through the impeller taken along the line 11—11 of Fig. 10.

The present embodiment of the invention contemplates, as shown in Figs. 1, 2 and 4, a frame indicated generally by the numeral 12, a feed mechanism designated generally by the numeral 13, and a blower mechanism 14. While the frame 12 may satisfactorily take a number of different specific forms, I have shown the same as herein comprising a transverse member 15 preferably in the form of an angle iron having trunnions 16 and 17 at its ends for the reception of wheels 18 and 19, which wheels serve in moving the conveyer from place to place. These wheels are held on the trunnions in a removable fashion, well known in the art, so that they may be easily removed and the frame rested directly on the ground when the machine is in operation. The frame also includes a longitudinally extending tongue 21 which serves as a part of the frame structure when the device rests upon the ground, and also serves as a tongue for attachment of the device to a tow vehicle. The tongue portion is beveled as shown at 22 for a purpose presently to be described. The frame also has a longitudinally disposed member 23 in the same plane as the tongue and extending in the opposite direction cooperating with the transverse member 15 and the tongue 21 to give the device stable support on the ground when the wheels are removed and the frame structure allowed to rest directly upon the ground.

The blower in its preferred form (as shown in Fig. 6) includes a housing indicated generally by the numeral 24, approaching the cylindrical in form and having an outer peripheral wall 25 and side walls 26 and 27. The blower has a depending bracket 28 (Fig. 4) having pivotal support on an upstanding bracket 29 attached to the frame, as, for example, by means of a bolt 31. The cylindrical portion 25 has a delivery tube 32 of conventional form disposed at one side thereof adapted to make connection with a delivery pipe 33 of the type commonly used for delivering the material from the blower to a remote point. Preferably these are interconnected by flanges 34 and 35 on the tube and pipe, respectively, adapted to be positioned in abutment in the manner shown in Fig. 6. A collar 36 is disposed around the flanges, and the flanges are held together by bolts 37 extending through the collar. Preferably an additional sleeve 38 is provided around the pipe 35 and engaged by the screws 37 so as to prevent rotation of the pipe 33 with rotation of the blower, as will presently be described. The collar 36 is supported rigidly in place by means of an arm 39 attached at one end to the frame and extending upwardly and inwardly as best shown in Figs. 2 and 4 to support the device in its rotation. Thus, the blower and the feed mechanism are rotatable as a unit about the axis of the tube 33 and the bolt 31 in a counterclockwise direction facing Figure 1, and through at least 90° so as to leave the space in front of the blower unobstructed and thereby permit a vehicle to be driven across the tongue 21 to a discharge position. Thereafter the blower and feed mechanism may be returned to its original position as shown in Figure 1 directly at the rear of the vehicle so that the material from the vehicle may be discharged from the rear directly into the hopper, such, for example, as might occur from discharge from a dump truck.

Attached to the outer surface of the frustoconical side member 26 is an engine indicated generally by the numeral 41, the engine in this instance being a two-cylinder opposed piston aircooled engine. The engine is preferably attached to said side member and supported thereon by means of brackets 42, which, in this instance, are integral with a bearing support 43 within which is disposed a bearing 44 supporting one end of the crank shaft 45 of the engine, the other end of the crank shaft being supported in a bearing 46. The crank shaft 45 projects inwardly through the blower side wall 26, the side wall being provided with a centrally disposed opening 47 arranged for the passage of a limited amount of air therethrough for ventilation purposes. The motor 41 is enclosed around its sides by an enclosure 48, in this instance open at its end as shown at 49, so as to confine the flow of air through the opening 47 and cause the same to pass in close proximity to the cylinders of the engine, thus effecting a flow of forced air over the cooling fins of the engine.

Positioned on the end of the shaft 45 and disposed within the blower housing is a hub comprising a sleeve portion 51 keyed to the shaft 45, and an outwardly flared flange portion 52 spaced from the inner surface of the side 26, the side of the flange opposed thereto being complementary for the reception of a disk 53, the disk being frusto-conical and being attached to the inner side of the flange 52, as by means of screws 54 so as to lie in parallel closely spaced relation to the inner surface of the side 26. Preferably the side 26 is curved inwardly as shown at 55 around the opening 47 so as to rest in close proximity to the disk 53 and inhibit the flow of air therethrough. The hub is also provided with a plurality of air channels 56 which communicate with the opening 47 and with the chamber of the blower housing, air being drawn into the blower housing through these channels, through the opening 47 and the enclosure 48 as heretofore described.

Positioned on the face of the disk 53 are a plurality of impeller vanes 57, the impeller vanes being outwardly or radially disposed about the center of rotation of the shaft 45. Each of these vanes has an outer end provided with a plurality of spaced teeth 58, the ends of the teeth extending to a point adjacent the periphery 25 of the blower, an opposite edge as indicated at 59 terminating in spaced relation to the side 27 of the blower sufficient to permit the passage of solid material between the edge of the vane and the side of the blower, and a sloping inner edge 61 sloping from the proximity of the hub toward the free edge 59, the degree of this slope being less than the angle of repose for the type of material passing through the blower.

The side 27 of the blower is provided with a central opening 62 preferably concentric with the axis of the shaft 45, the side 27 being curved inwardly as shown at 63 annularly of the opening 62. Preferably the metal is curved outwardly directly at the opening as shown at 64 to provide desirable aerodynamic characteristics at the opening 62.

A feed tube designated generally by the numeral 65 is supported to project through the central opening 62 preferably concentric therewith, and is supported on the blower housing by means of brackets 66, the end 67 of the feed tube preferably projecting into the blower slightly beyond the plane of the opening 62. The solid material to be conveyed is fed into the blower housing through the feed tube 65 by means of a feed screw 68 disposed within the feed tube. The helix 69 thereof fits into the tube with reasonable closeness so as to rotate freely and yet so as to deliver a constant amount of material as it rotates. The helix is carried on a tube 71 which forms the shaft of the screw, the tube and helix extending substantially the full length of the feed tube 65. The outer end of the feed tube is closed as shown at 72 (Fig. 5) and has an opening 73 for the passage of the end of the shaft 71, the end thereof being supported in a bearing 74 disposed against the outer side of the end wall 72. Positioned on the end of the shaft 72 is a gear 75, fixed thereto and adapted to mesh with a spur gear 76 integral with a pulley 77 carried on a fixed shaft 78. The pulley 77 is belted to a pulley 79 of the type in which the effective diameter thereof can be changed, which pulley is attached to the end of a shaft 81 disposed within the tubular shaft 71 of the screw and extending therethrough, the opposite end of the shaft 81 being squared as shown at 82 and received in a squared opening 83 in the end of the motor shaft 45. The forward end of the screw shaft 71 is given lateral support on the shaft 81 by means of a roller bearing 84 disposed on the shaft 81 (note Fig. 6). It will be seen that the screw 68 is thus driven from the engine through the shaft 81, the pulley 79, the pulley 77, and the gears 76 and 75, and that by means of the adjustment on the pulley 79 the speed of rotation of the screw can be adjusted within limits, depending upon the character of the material to be handled.

Positioned on the top of the feed tube 65 is a hopper having side walls 85 and 86 and end walls 87 and 88, for convenience, the slope of the side wall 85 being substantially greater than that of the side wall 86 and being designed to constitute the side of the hopper from which the material is fed. The interior of the hopper communicates substantially throughout its length with the interior of the feed tube 65 so that the screw conveys the material forward from the bottom of the hopper into the blower, the screw rotating at a speed substantially less than that of the blower impeller. The hopper is preferably of a length at least as great as the width of a conventional vehicle so that the material, such as silage or hay, may be moved off the rear of the vehicle across the entire width thereof and will drop into the hopper. The outer end of the feed mechanism is supported on a leg 89 attached to the bottom of the feed tube and extending downwardly, the bottom end thereof being notched as shown at 91 so as to seat over the tongue 21 and be located in operative position thereby and held against accidental lateral displacement. The flexibility in the parts is sufficient to permit the free end of the feed tube mechanism to be lifted so as to raise the leg off from the tongue and permit rotation of the feed and blower mechanism, as heretofore described.

As heretofore described, the solid material is deposited in the hopper, and through rotation of the screw is moved forward to be deposited in the blower housing beyond the end 67 of the feed tube. It will be seen that so long as sufficient material is maintained in the hopper to cover the feed screw, the screw will move solid material forward into the blower at a substantially uniform rate. By adjusting the rate of feed by means of the adjustable pulley, an optimum ratio of solid material and air can be obtained which will produce the most efficient results. It will be seen that if this ratio is too great, conveying will cease and clogging of the blower will be produced, and if too small, the conveyer becomes inefficient. Through this mechanism the rate of feed can be adjusted to the optimum by supplying a controlled and definite quantity of solid material to the blower. Furthermore, adjustment can be made to meet other variable conditions such as the type of material being handled, and the height or distance through which it is being conveyed.

As the material is being discharged from the end of the feed tube, air is simultaneously being drawn in through the central opening 62 in a direction to cause the solid material to move away from the stationary side 27 of the blower and into contact with the curved outer end of the impeller hub. This is further facilitated by depositing the material toward the center of the housing and by dishing the side wall 27 adjacent the central opening. This greatly tends to eliminate side wall friction, that is, friction of the material being dragged over the stationary side wall 27 of the housing, since centrifugal force urges the material in the direction of the revolving disk 53. Furthermore, due to the dishing of the side wall 27, the radial flight of the material through the blower carries the material away from this stationary wall. In this way I have materially reduced or completely eliminated side wall friction and the resultant loss of efficiency and damaging of material.

As the material enters the housing it first meets with the shallow inner ends of the vanes 57 moving at a substantially lesser velocity than the same vanes at a greater radial distance from the axis. This causes the material to be accelerated more gradually and with less impact loss and less damage to the material. It will be seen that this gradual acceleration is facilitated by the fact that the impeller hub and the disk 53 are in rotation, and by the fact that the material is protected against contact with the stationary side 26 of the housing.

It will be seen that since the inner ends of the vanes 57 have an angle such that the solid material will slide therealong under the centrifugal force existing in the blower, the trapping or catching of material on the inner ends of the vanes is prevented, since the material slides down the sloping end 61 and past the edge 59 into the periphery of the housing.

The toothed outer ends 58 of the vanes function to substantially eliminate a number of difficulties heretofore associated with blowers of this type. In the first place, the provision of the fork-like projections on the outer ends of the vanes which travel with small clearance at the inside periphery of the housing cause the material to be moved over the peripheral surface with the tendency for wedging almost entirely eliminated. It will be seen that should an accumulation of material exist at any point along the periphery, the teeth will penetrate through the material so as to produce a minimum of pressure between the ends of the vanes and the peripheral surface, and the excess material will find room in the space between the ends of the teeth. Another advantage of this construction is that the space between the teeth provides an area for the circulation of air through the exhaust. Air circulation in the direction of rotation of the impeller and around the periphery toward the delivery pipe 32 improves the efficiency of the blower and reduces the tendency of the material to remain close to the ends of the vanes. Blowers constructed in accordance with this principle have shown no tendency to become hot at their peripheral surface, whereas the conventional blowers used for this purpose and having close fitting vanes across the entire peripheral surface become highly heated after a short period of operation. Thus, in this way I have eliminated the wedging of material at the ends of the vanes and simultaneously improved the air discharge efficiency.

Directing attention now more particularly to the modified form of the invention shown in Figs. 8 and 9, the impeller therein shown is suitable for use in place of the impeller of Fig. 6 with slight modifications in the shape of the blower housing. However, in this instance, I have shown a conventional casing including sides 92 and 93, a bearing 94a carrying a shaft 45a which may be driven in any suitable manner. The impeller includes a flat disk 94 to which impeller vanes 95, in this instance, three in number and substantially identical with impeller vanes 57, are positioned, one edge 96 thereof being arranged in spaced relation to a second flat disk 97. The disk 97 is provided with a central opening 99 for the passage of the end 67 of the feed tube 65, and the shaft 45a may be provided with a socket 98 for driving the worm, or if desired, the worm may be driven by separate drive mechanism. Interposed between each of the vanes 95 is an additional vane, each of which have toothed outer ends as shown at 101, the vanes extending inwardly from the periphery only a short distance and then being curved outwardly as shown at 102 to provide an inner end of relatively great curvature, the curvature being such as to discourage the lodging of fibrous material on the inner ends of these vanes. The intermediate vanes are attached at their opposed edges to the disks 94 and 97 as shown at 103 and 104, these vanes serving to secure the disks together and to cause the disk 97 to rotate with the disk 94.

It will be seen that with this construction both of the side walls of the blower chamber rotate with the impeller vanes so that any possibility of the material being dragged over a stationary wall of the blower housing (other than the peripheral wall) is entirely eliminated. This blower construction has substantially all of the advantages of that shown in Fig. 6 and heretofore described, but has the disadvantage of being slightly more costly to manufacture.

In Figs. 10 and 11 I have shown a still further embodiment of the invention. In this form of the invention the housing is substantially similar to Fig. 9 and has side walls 105 and 106, the side wall 106 having a centrally disposed opening 107 corresponding to the opening 62 of Fig. 6. The impeller has a hub 108 driven by shaft 45a, and carried on the hub is a disk 109 adapted to rotate in relatively close proximity to the side wall 105. Carried on the disk 109 are radially disposed vanes 111 attached at one edge to said disk, the vanes being similar to the vanes 57 of Fig. 6 and having free edges 112 and teeth 113 at their outer ends in close proximity to the periphery of the blower housing. Mounted adjacent the side wall 106 is a second disk 114 having a central hub 115 providing a central opening for the passage of material to the space between the two disks. The disk 114 is mounted for rotation against the side 106 by means of rollers 116 which seat in grooves 117 on the outer surface of the hub 115. The inner face of the disk 114 is provided with short vanes 118 equal in number to the vanes 111 and of a height such that when in registration with the vanes 111 a space exists between the edges of the two vanes, as indicated at 119.

In this form of the invention the disk 114 is free to float in the housing. As a result, this disk is normally driven by the fluid pressure of the air stream generated by the vanes 111. However, as material passes from the feed tube radially outward between the vanes of the impeller, the disk 114 is free to adjust itself in response to the wedging of material between the vanes 111 and the vanes 118. Consequently, upon the tendency of material to wedge between these vanes, the disk 114 will rotate with respect to the disk 109 to permit the passage of material radially outward between the two sets of vanes. It will be seen that this construction prevents the solid material from contacting the stationary sides of the blower during its passage therethrough and correspondingly reduces the frictional loss. Likewise, this form of the invention has substantially all of the advantages above described in connection with the form of Fig. 6.

I claim:

1. The combination in a blower particularly suited for fibrous material, of a housing having enclosing side walls, an impeller in said housing for moving air therethrough, one of said side walls having a centrally disposed feed opening for supplying solid material to said impeller and an air inlet disposed therearound, an air-cooled engine mounted on the other of said side walls including a shaft projecting therethrough to carry and drive said impeller, an enclosure for said engine having an air opening, and a centrally disposed opening through said side wall between said housing and said enclosure, said air opening and said centrally disposed opening being positioned to move a part of the air supply of said blower across said engine, another part of the air supply entering the blower through said air inlet to provide converging streams of air from opposite sides of the housing.

2. The combination recited in claim 1 wherein a feed screw is disposed in said feed opening, said shaft is substantially coaxial with respect thereto and is directly coupled thereto.

3. The combination in a blower particularly suited for fibrous material of a housing having spaced enclosing side walls, an impeller in said housing for moving air and solid material therethrough, each of said side walls having a central opening coaxial with said impeller, a feed tube fixed to one side wall and extending into the opening thereof, said tube having a hopper on the upper side thereof, said tube and hopper having a length slightly greater than the width of a standard truck body to receive said material falling therefrom across the entire width of the body, a motor mounted on the other of said side walls having a shaft extending through the opening thereof into said housing to carry and drive said impeller, said openings providing streams of air into said housing from opposite sides thereof converging intermediate said side walls to direct solid material away from said walls, a feed screw disposed in said tube for feeding solid material into said blower, said tube having a hollow shaft projecting beyond the end of said tube, a drive shaft directly connected to the shaft of said motor disposed within said hollow shaft and projecting beyond the end thereof, variable speed drive means disposed between said drive shaft and said hollow shaft at the end of said tube for driving said hollow shaft and feed screw at any of a plurality of feeding speeds different from that of said drive shaft, and a bearing between the drive shaft and the hollow shaft adjacent the impeller for supporting the end of the feed screw on said drive shaft.

4. The combination in a conveyer for fibrous material, of a blower, means for feeding material to said blower comprising a laterally disposed hopper, and means for conveying material from the hopper to the blower, a discharge tube for conveying material away from said blower, a base frame, and means for supporting said blower and said feeding means on said frame for rotation as a unit about the axis of said tube to at least about 90° between operative and inoperative positions for the passage of a vehicle through the space occupied by said hopper in said operative position.

5. The combination in a conveyer for fibrous material, of a blower, means for feeding material to said blower comprising a laterally disposed hopper, and means for conveying material from the hopper to the blower, a vertically disposed discharge tube on said blower in registration with a stationary delivery pipe, a driving motor mounted on said blower, a base frame, means for supporting said blower, said feeding means and said motor on said frame for rotation as a unit about the vertical axis of said tube to about 90° between operative and inoperative positions for the passage of a vehicle through the space occupied by said hopper in said operative position, and means for locating said blower, motor, and feeding means in operative position.

6. The combination in a conveyer for fibrous material, of a blower, means for feeding material to said blower comprising a laterally disposed hopper, and means for conveying material from the hopper to the blower, a base frame, and means for supporting said blower and said feeding means on said frame for rotation as a unit through at least about 90° between operative and inoperative positions for the passage of a vehicle through the space occupied by said hopper in said operative position, said base frame being adapted to rest upon the ground when in service and having a tongue disposed beneath said feeding means in the operative position thereof shaped to be passed over by a vehicle in said inoperative position, said frame also having spindles for the reception of wheels for transportation of the conveyer from place to place.

CARL E. SWENSON.